US006547335B2

(12) United States Patent
McSweeney

(10) Patent No.: US 6,547,335 B2
(45) Date of Patent: Apr. 15, 2003

(54) DUMP TRUCK BED HAVING GROUND-ENGAGING REAR PIVOT LEVER ARM

(76) Inventor: Patrick McSweeney, Cahernacrin, Bantry, County Cork (IE)

( * ) Notice: Subject to any disclaimer, the term of this patent is extended or adjusted under 35 U.S.C. 154(b) by 0 days.

(21) Appl. No.: 09/950,824

(22) Filed: Sep. 13, 2001

(65) Prior Publication Data

US 2002/0036424 A1 Mar. 28, 2002

(30) Foreign Application Priority Data

Sep. 14, 2000 (IE) .......................................... S2000/0735

(51) Int. Cl.⁷ ................................................. B60P 3/06
(52) U.S. Cl. ........................ 298/12; 298/17.5; 414/477
(58) Field of Search .............................. 298/11, 12, 14, 298/17.5, 17.8, 22 B, 22 D, 22 R; 414/477, 480

(56) References Cited

U.S. PATENT DOCUMENTS

| 1,925,296 | A | * | 9/1933 | Barrett | 298/22 R |
|---|---|---|---|---|---|
| 2,037,999 | A | * | 4/1936 | Ochsner | 298/22 D |
| 2,741,383 | A | * | 4/1956 | Leckert | 414/484 |
| 2,983,396 | A | * | 5/1961 | Evans | 414/477 |
| 3,336,080 | A | * | 8/1967 | Heck et al. | 298/17.5 |
| 3,375,946 | A | * | 4/1968 | Drake | 414/477 |
| 3,610,690 | A | * | 10/1971 | Mengel | 298/17.5 |
| 3,638,817 | A | * | 2/1972 | Corompt | 414/477 |
| 3,907,364 | A | * | 9/1975 | Hnath | 298/11 |
| 4,015,879 | A | * | 4/1977 | Shonkwiler | 298/14 |
| 4,139,236 | A | * | 2/1979 | Hill et al. | 298/14 |
| 4,147,266 | A | * | 4/1979 | Corompt | 414/480 |
| 4,348,054 | A | * | 9/1982 | Shonkwiler et al. | 298/11 |
| 5,562,390 | A | * | 10/1996 | Christenson | 414/477 |

FOREIGN PATENT DOCUMENTS

| EP | 45398 A1 | * | 2/1982 | 414/477 |
|---|---|---|---|---|
| JP | 01052538 | * | 2/1989 | 414/477 |
| JP | 52073413 | * | 9/1999 | 298/14 |

* cited by examiner

Primary Examiner—D. Glenn Dayoan
Assistant Examiner—Paul Chenevert
(74) Attorney, Agent, or Firm—Jacobson Holman PLLC

(57) ABSTRACT

A pivot mounting assembly (10) allows a standard tipping truck (1) to easily transport material for example earth moving machinery (20). The assembly (10) comprises a lever arm (11) between the chassis (2) and body (3) which can be pivoted by a ram (15) to cause the body (3) to rest on the ground (6).

73 Claims, 12 Drawing Sheets

DUMP TRUCK BED HAVING GROUND-ENGAGING REAR PIVOT LEVER ARM

Figure 1:
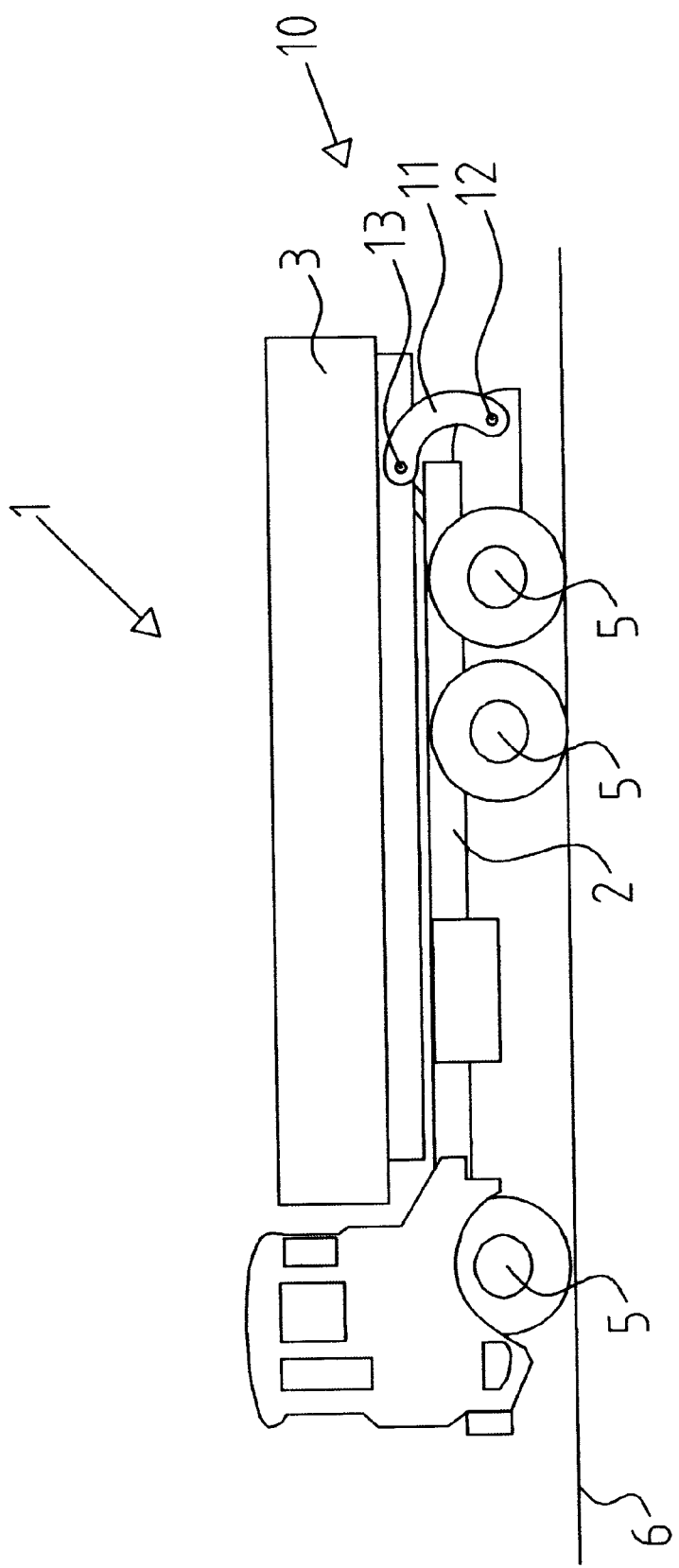

The present invention relates to a pivot mounting assembly for mounting a tipping trailer body on a trailer chassis of the type in which the pivot mounting assembly provides a pivot axis on the trailer chassis about which the trailer body is raised off and onto the trailer chassis by a tipping ram.

In particular the present invention relates to tipping trucks and tipping trailers, hereinafter generally encompassed under the term "tipping trailers". Thus, trailer chassis and trailer body also refers to a vehicle body and a vehicle chassis Tipping trailers are used extensively for the delivery of material such as stone, gravel, macadam, etc. from place to place. The standard tipping truck is an exceptionally useful piece of equipment However, very often it is required to transport machinery on such trailer bodies such as tractors, small excavators and various other dumpers, forklifts and mechanical engineering equipment generally. Many of these are machinery which have ground engaging wheels or tracks. To get them onto the trailer body, the trailer body is held in the horizontal position and planks or other means are used to form a ramp between the rear of the trailer body and the ground and then the equipment is in some way manhandled up the ramp so formed to put the equipment in the trailer body. In many instances, a ramp is not sufficient and usually the truck has to be backed up against a dock or the like raised ground to allow relatively heavy equipment to be placed on the trailer. The use of planks or other ramp forming means is often insecure and dangerous in the sense that it would be dangerous for example to drive a forklift truck up such a structurally insecure ramp. Indeed, it is often done and it has been the cause of many an accident. The same problem then arises after the equipment has been delivered by the truck to its destination in that it then has to be unloaded from the trailer body when the reverse process is carried out.

The present invention is directed towards providing means so that a tipping trailer could overcome these problems.

STATEMENTS OF INVENTION

According to the invention there is provided a pivot mounting assembly for mounting a tipping trailer body on a trailer chassis of the type in which the pivot mounting assembly provides a pivot axis on the trailer chassis about which the trailer body is raised off and onto the trailer chassis by a tipping ram characterised in that the assembly comprises an elongate lever arm having a chassis pivot locator for connection to the trailer chassis and a spaced apart body pivot locator for connection to the trailer body and actuating means to pivot the lever arm about the trailer chassis to cause a portion of the trailer body on raising the trailer body to project away from and below the trailer chassis. Effectively the trailer body forms now its own ramp to allow equipment to be driven on and off the trailer body and thus in effect the pivot mounting assembly effectively provides a drive-on tipper truck for loading equipment and other machinery thereon.

In one embodiment of the invention the spaced apart pivot locators are so arranged that the body pivot locator is closer, in use, to the tipping ram than the chassis pivot locator. This allows the trailer body to be first lifted up away from the chassis and pivoted rearward before it is pivoted downward. It facilitates the provision of what is in effect a relatively gentle slope to climb for the equipment being loaded.

In one embodiment of the invention the body pivot locator in use with the trailer body lowered onto the trailer chassis is above the chassis pivot locator. This again provides a very efficient way of moving the trailer body.

In another embodiment of the invention there is provided a base frame for connection to the trailer chassis and in which the chassis pivot locator is pivotally connected to the base frame. In this way a retro-fit pivot mounting assembly may be provided which can be easily mounted on an existing truck, Obviously if a truck is being built the chassis can be modifed ab initio to take the pivot mounting assembly according to the invention, but for many existing trucks ideally the pivot mounting assembly could be provided as an add-on unit which can be easily affixed to an existing chassis of either a trailer or a vehicle.

Ideally the pivot mounting assembly comprises a trailer body engaging support for the trailer body when the trailer body projects beyond and below the trailer chassis. This will add further support to the trailer body when it is being loaded and unloaded.

Ideally the spacing between the pivot locators is chosen to allow the trailer body to rest on the ground.

Ideally the actuating means is a ram connected to the lever arm and the ram has a connector for mounting on the trailer body and a connector on the vehicle chassis.

Further invention provides a tipping trailer incorporating a pivot mounting as described above. It will be appreciated that such a tipping trailer will be particularly advantageous in use as it is now a drive-on tipper truck.

DETAILED DESCRIPTION OF THE INVENTION

Figure 2:
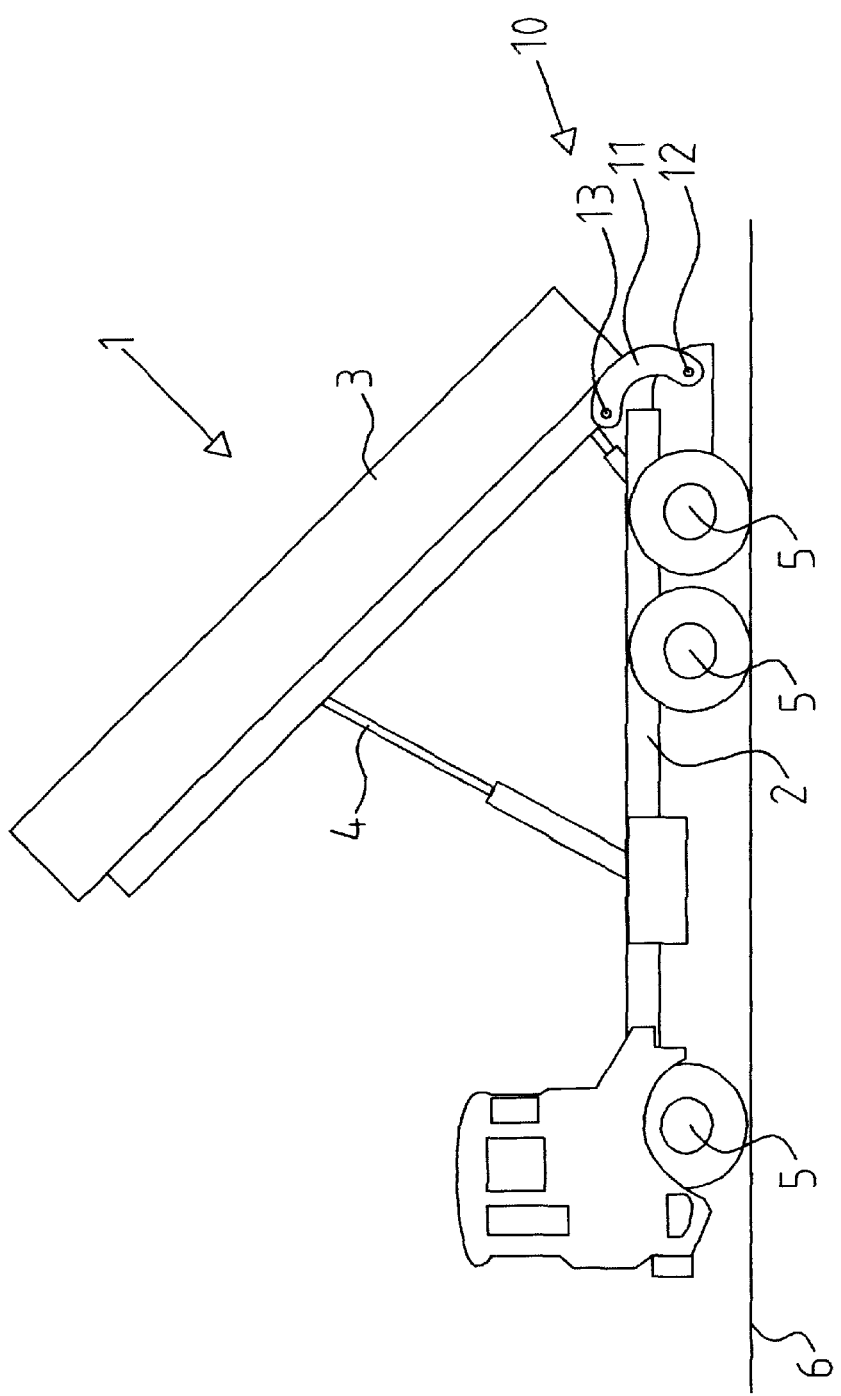
Figure 3:
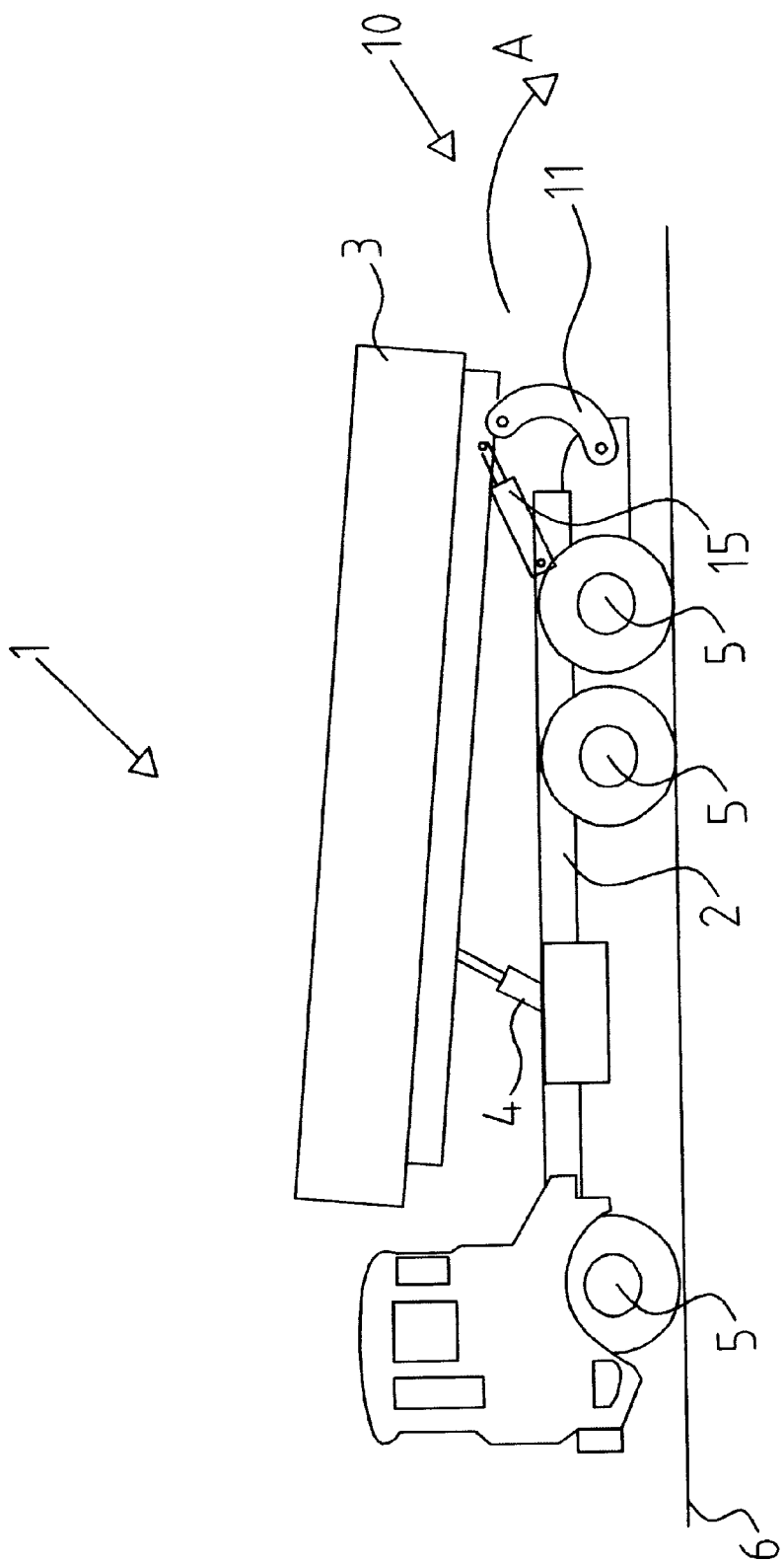
Figure 4:
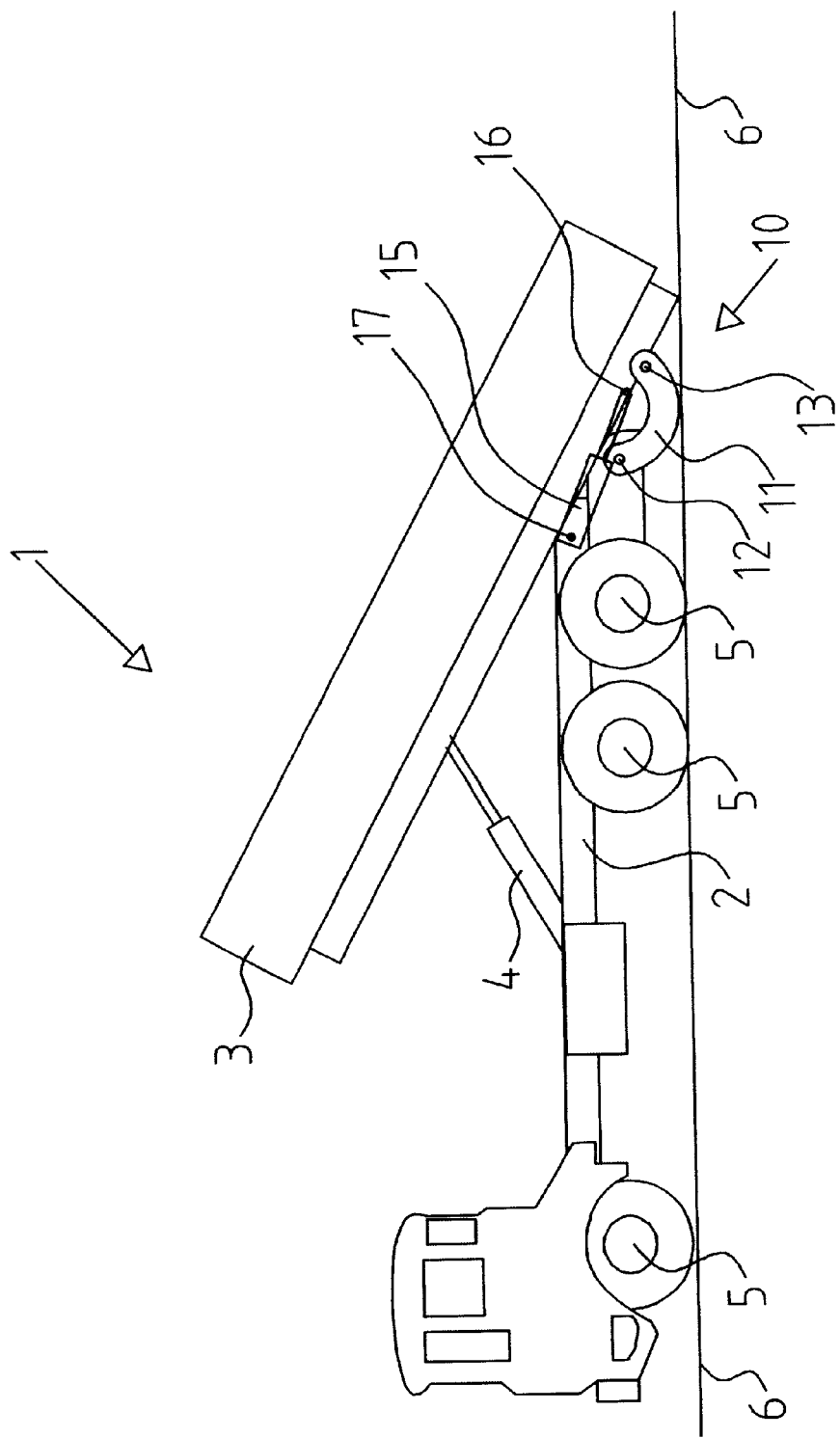
Figure 5:
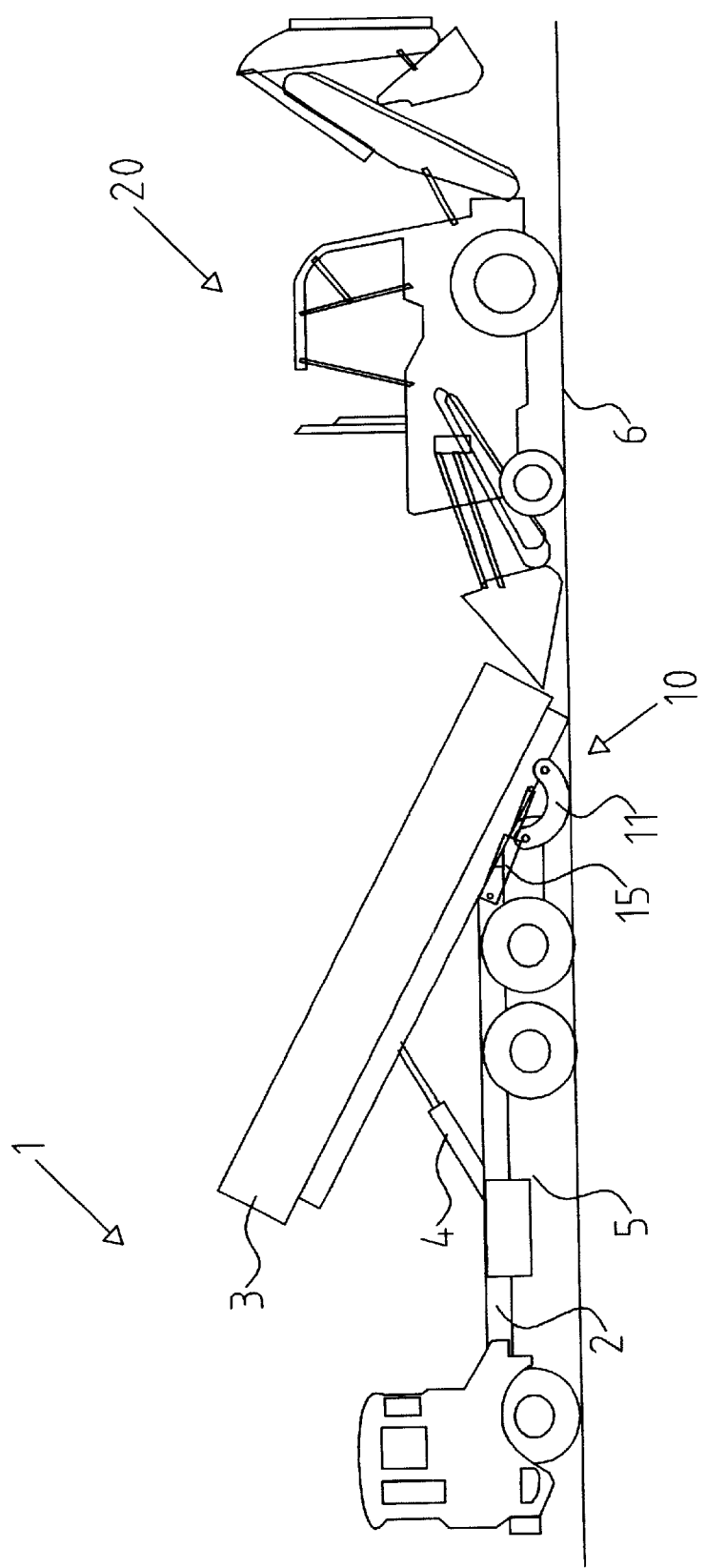
Figure 6:
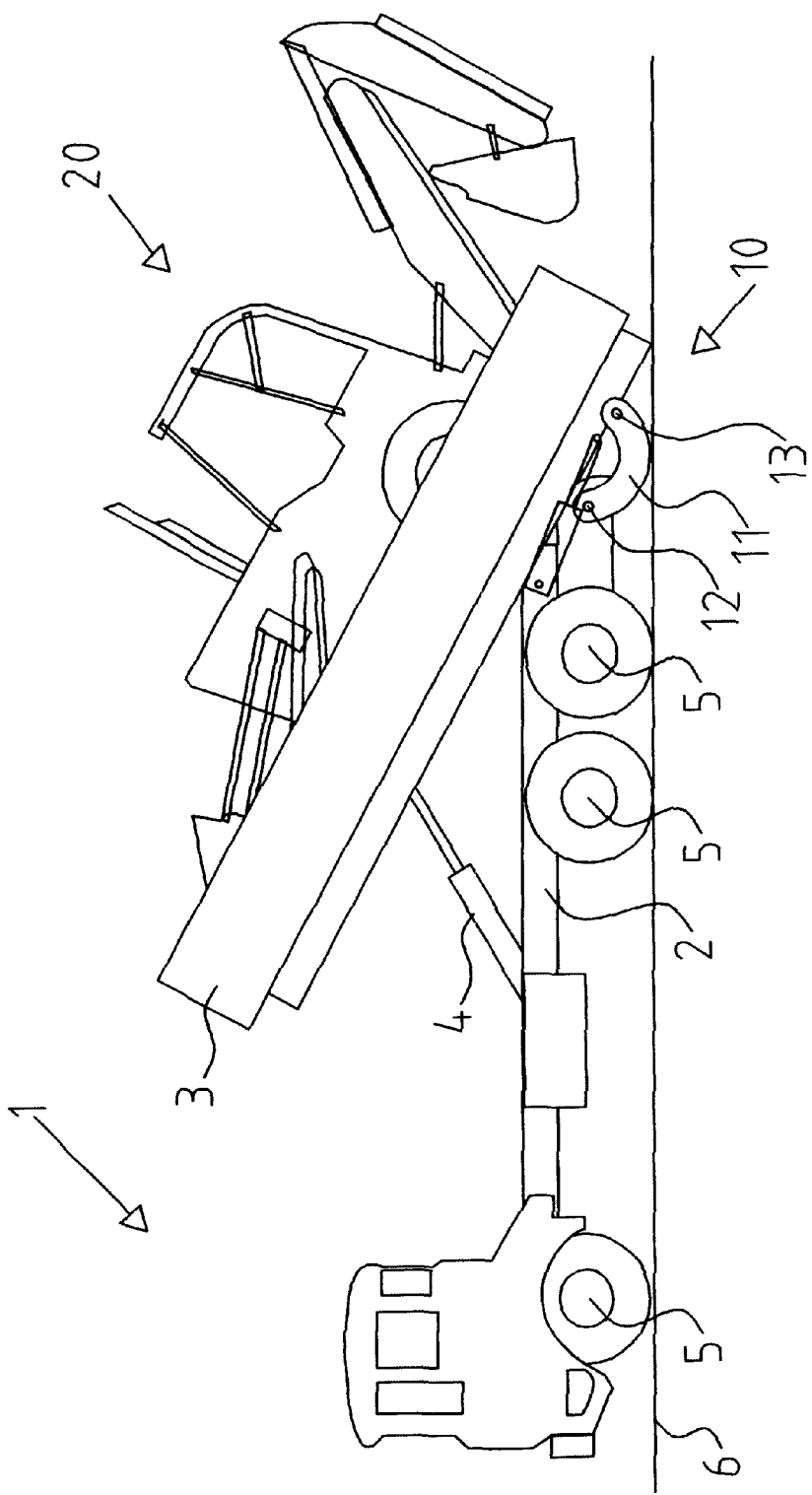
Figure 7:
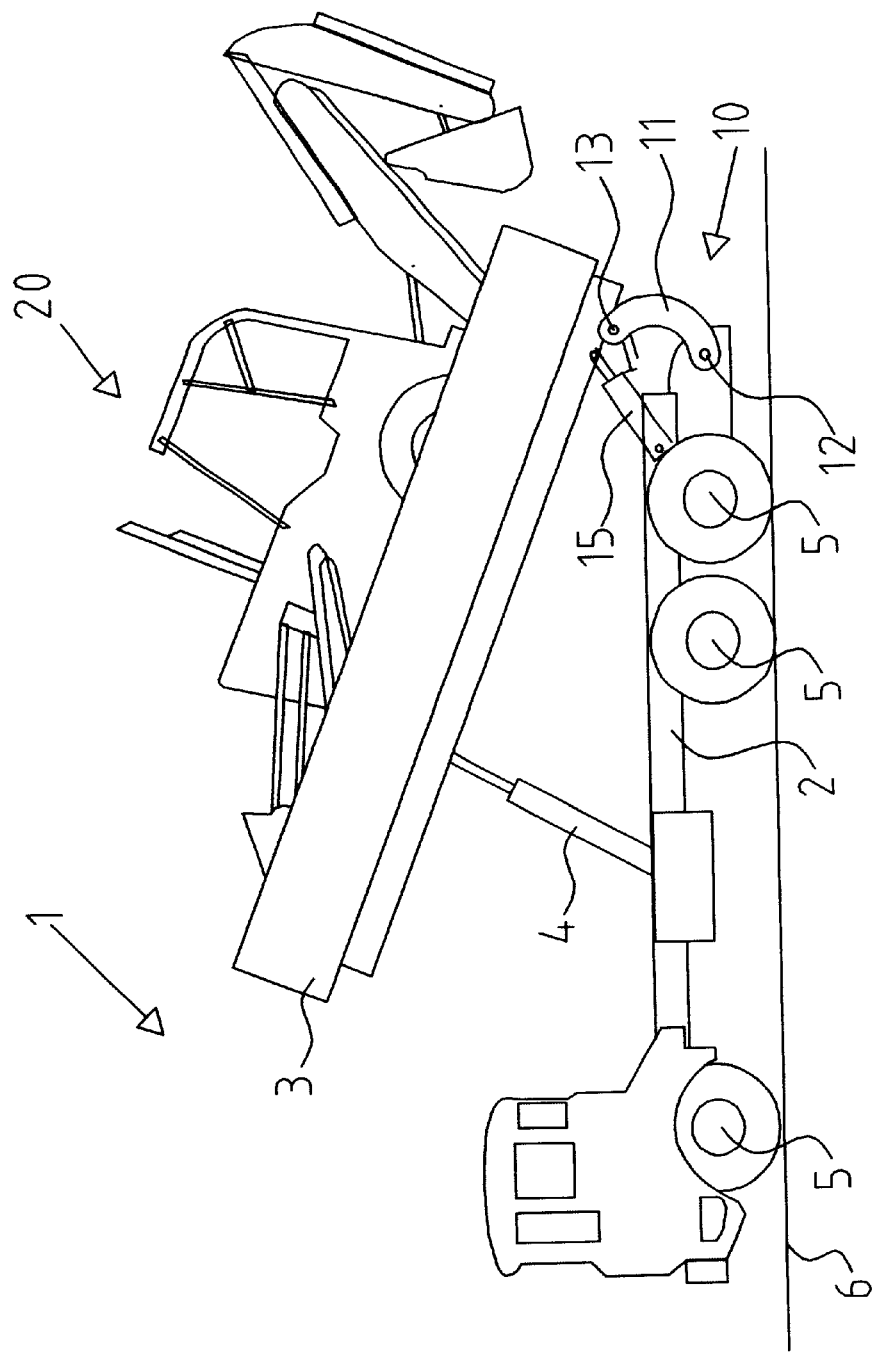
Figure 8:
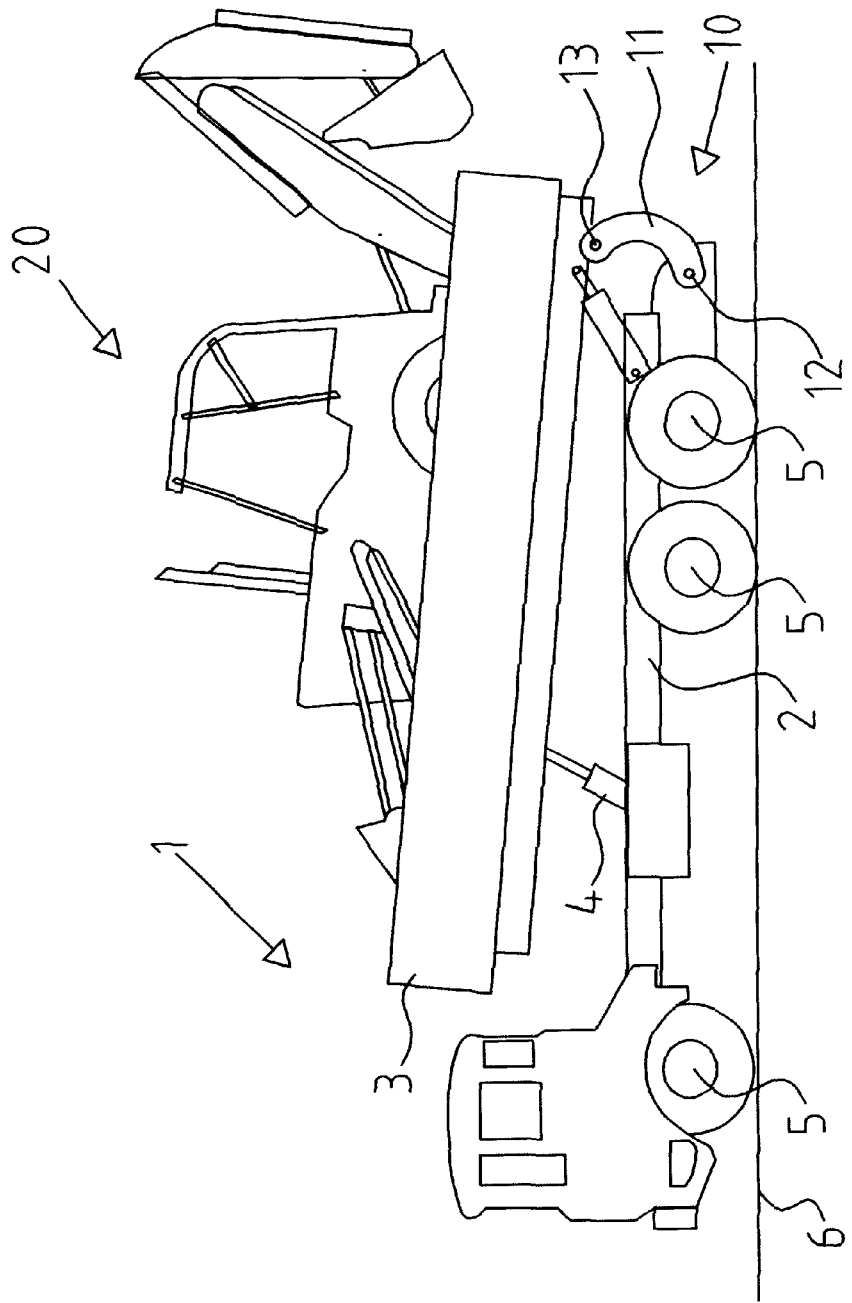
Figure 9:
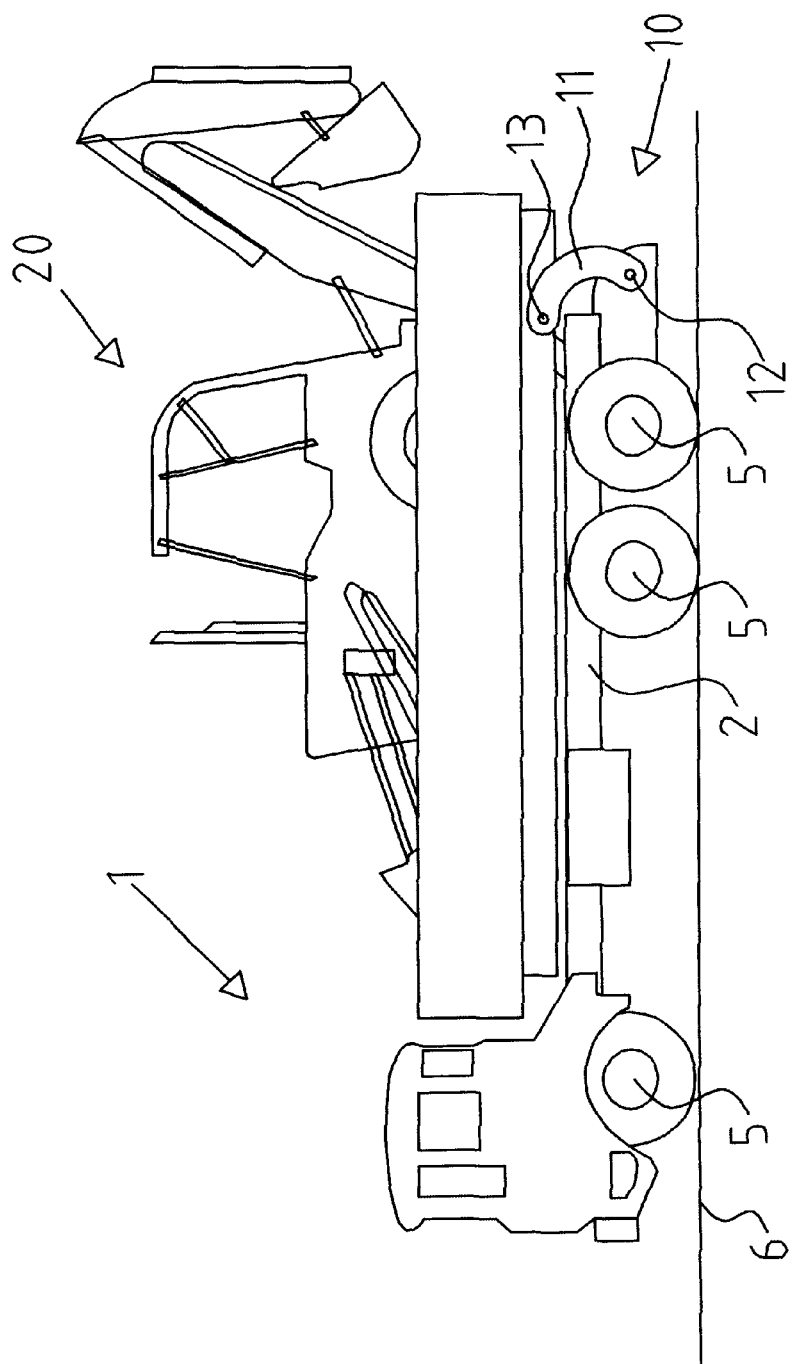
Figure 10:
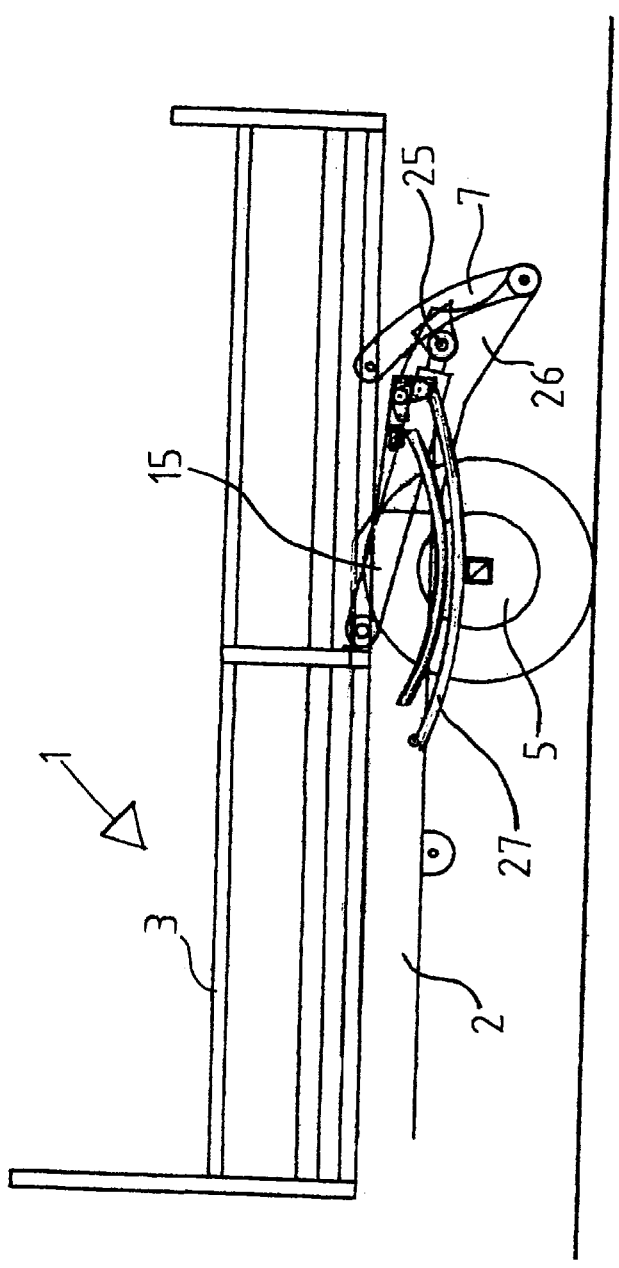
Figure 11:
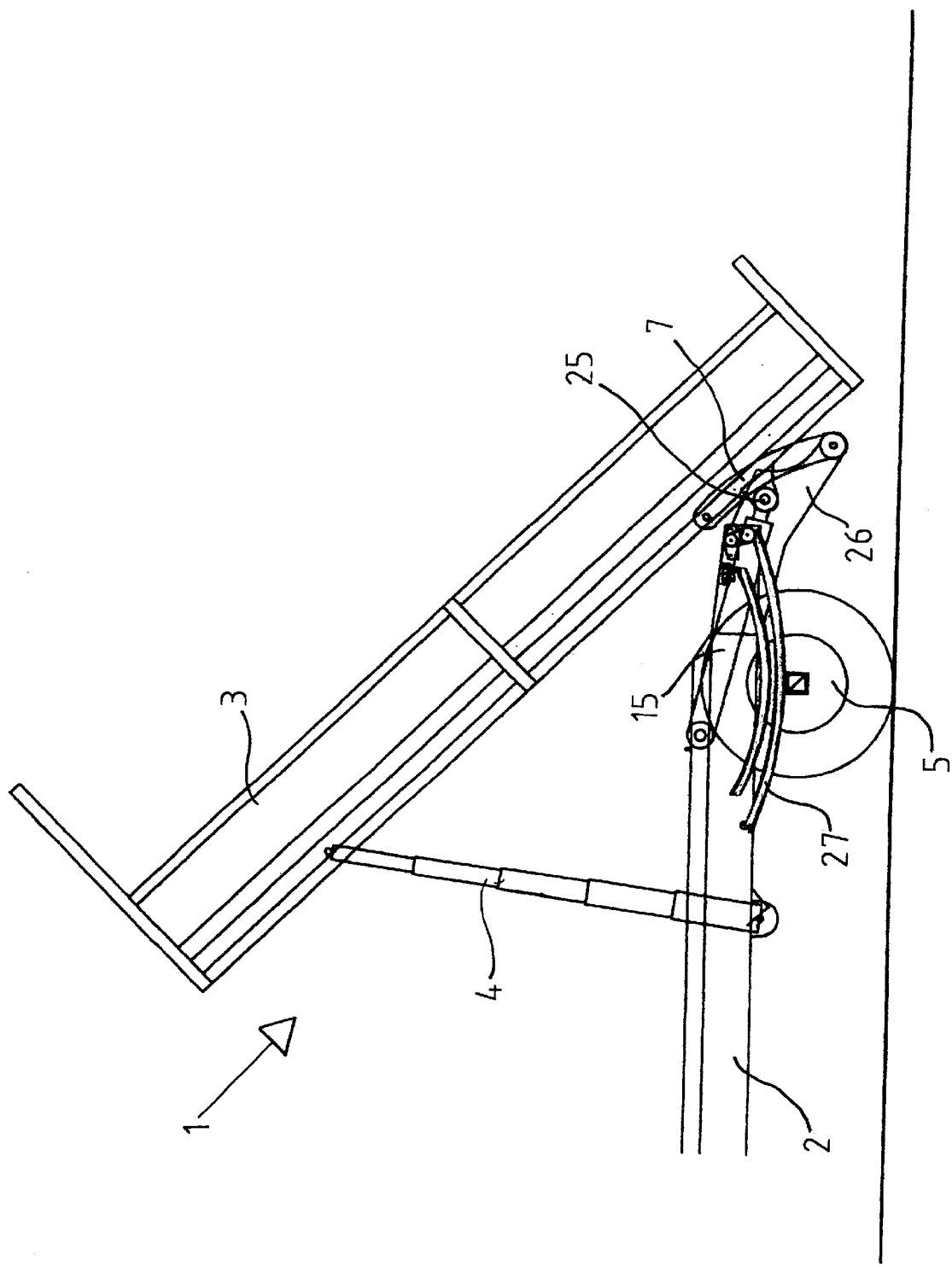
Figure 12:
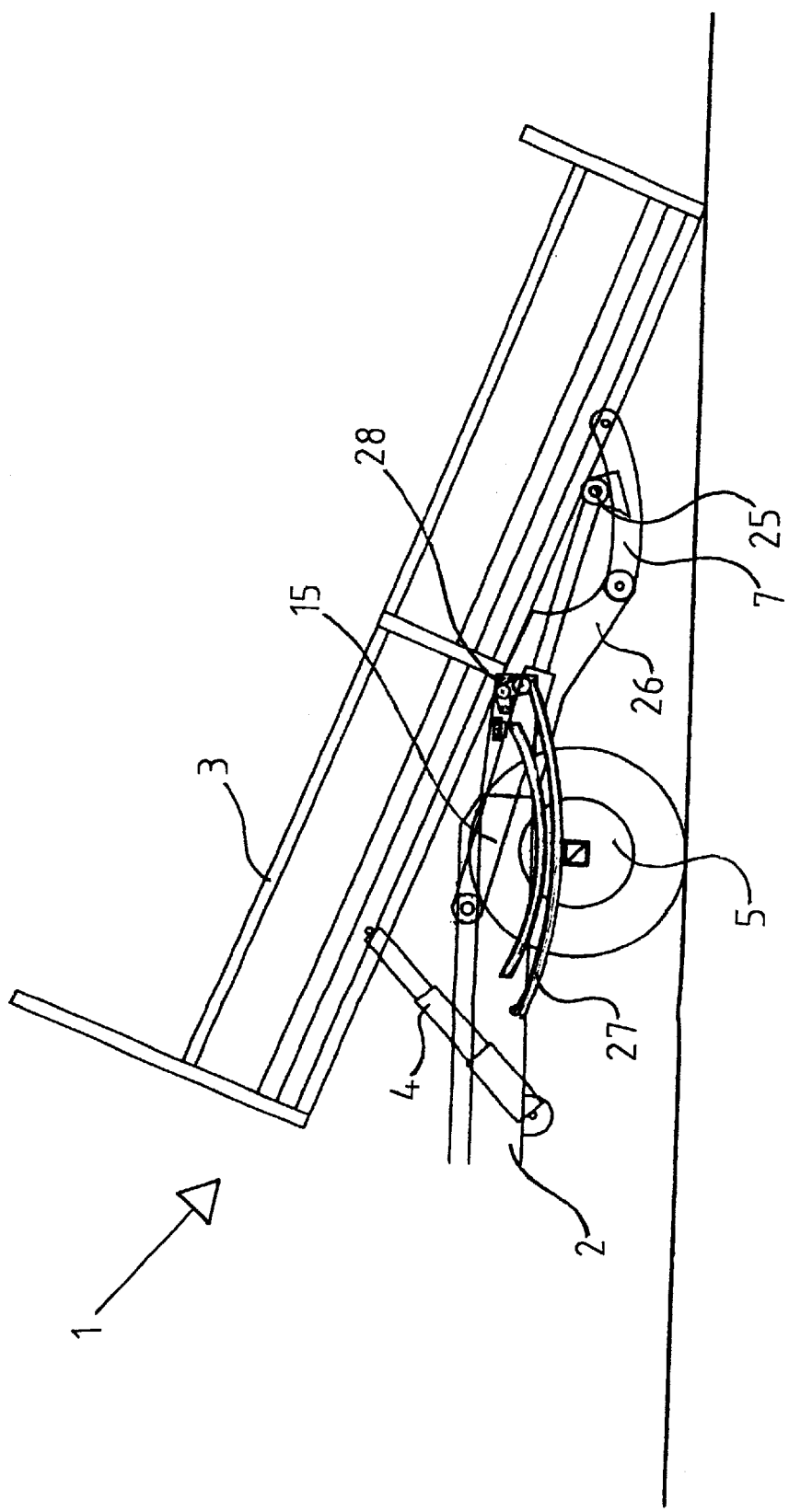

The invention will be more clearly understood from the following description of an embodiment thereof, given by way of example only, with reference to the accompanying drawings, in which;

FIG. 1 is a side view of a tipping truck according to the invention,

FIG. 2 is a side view showing the truck tipped into a normal material discharge position, FIG. 3 shows the tipping truck in a tipping position utilising the invention, FIG. 4 shows the tipping truck tipped so that the rear of the trailer lies on the grounds, FIG. 5 shows a mechanical shovel offered up to the trailer, FIG. 6 shows the mechanical shovel on the trailer, FIG. 7 shows the mechanical shovel with the trailer tipping into its rest position, FIG. 8 shows further tipping of the trailer, FIG. 9 shows the trailer in the same position as FIG. 1 with the loading shovel now safely loaded on the trailer, FIG. 10 is a side view of portion of another construction of tipping trailer according to the invention, FIG. 11 is a side view of the tipping trailer of FIG. 10 in the normal tipping position for discharging material, FIG. 12 is a side view of the tipping trailer of FIG. 10 in the machinery loading position, and FIG. 13 is a plan view of the trailer chassis with the body, wheels and springs removed.

Referring to the drawings and initially to FIGS. 1 to 9 thereof there is illustrated a tipping truck, indicated generally by the reference numeral 1, having a conventional vehicle chassis namely a trailer chassis 2 and a trailer body 3 having a double acting tipping ram 4 and ground engaging wheels 5 which rest on the ground identified by the reference numeral 6. All of this is conventional except that instead of having a conventional pivot mounting at the rear of the trailer chassis 2, there is provided a pivot mounting assembly indicated generally by the reference numeral 10. There are two pivot mounting assemblies one on either side of the trailer chassis 2. The assembly 10 comprises an elongate arcuate ever arm 11 having a chassis pivot locator 12 for connection to the trailer chassis 2 and a spaced apart body pivot locator 13 for connection to the trailer body 3. There is further provided actuating means in this embodiment a hydraulic ram 15. The ram 15 is mounted by a pivot connector 16 on the trailer body 3 and by a pivot connector 17 on the vehicle chassis 2.

Referring now to FIG. 2, the tipping truck 1 can be operated in conventional manner to discharge a load, the tipping ram 4 being operated in normal material discharge fashion so that the trailer body 3 is raised to about 45°. The ram 15 in this case is not used. The pivot mounting assembly 10 is operating as a conventional pivot.

However, if it is desired to load for example a loading shovel onto the trailer body 3, the tipping ram 4 and the ram 15 are operated so that the lever arm 11 starts to pivot upwards and then around in the direction of the arrow A (see FIG. 3) until the trailer body 3 rests on the ground 6 (see FIG. 4). Then as can be seen from FIG. 5 a loading shovel identified by the reference numeral 20 is driven up to the trailer body 3 and then driven up it (see FIG. 6). The tipping ram 4 and ram 15 are used to pivot the trailer body 3 carrying the loading shovel 20 first upwards off the ground and then across the trailer chassis 2 (see FIG. 8) into the transport position (see FIG. 9). The rams 4 and 15 can be operated sequentially or simultaneously.

Referring now to FIGS. 10 to 13 inclusive, there is illustrated an alternative construction of trailer. However, since this is substantially identical to the previously described construction with reference to FIGS. 1 to 9 parts similar to those described with reference to FIGS. 1 to 9 are identified by the same reference numerals. In this embodiment the lever arm 7 carries a trunion 25 to which the ram 15 is connected. In this embodiment the lever arm 7 is mounted on a base frame 26 which is connected to the trailer chassis 2 The base frame 26 could be formed as an extension of the trailer chassis 2 when the trailer chassis is 2 originally constructed, but for retro-fitting will obviously be a separate base frame or plate which will be welded or bolted to the vehicle chassis 2. There are also illustrated in this embodiment leaf springs 27 carried on trailer body supports 28 against which the trailer body 3 rests in the loading position as illustrated in FIG. 12.

It is envisaged that lever arms other than the ones described may be provided and that it is not necessary though generally desirable that the pivot locators are so-arranged that the body pivot locator is closer in use to the tipping ram than the chassis pivot locator as this will allow a greater pivotal movement of the lever arm, but again this is not essential. Nor indeed is it essential but desirable that when the spacing between the pivot locators is chosen that it should be chosen so as to allow the trailer body rest on the ground in all situations and further the pivot locator should in use with the trailer body lowered onto the trailer chassis be above the chassis pivot locator, but again this is not essential. Also it is important that in many instances that the lever arm is not mounted in such a manner that in the transport position it is lower than the lowermost part of the vehicle or trailer chassis which will usually be the transmission or the vehicle axle.

Also, generally speaking, it will be possible with the invention to have an incline in the trailer body when loading of the order of 18° or less which will ensure safe loading.

Where the actuating means described above is a tipping ram, it will be appreciated that other forms of actuators may be used. However, generally speaking since such tipping trailers are usually operated by tipping rams, a hydraulically or pneumatically operated ram will be the most usual actuator.

In the specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described but may be varied in both construction and detail.

What is claimed is:

1. A pivot mounting assembly for pivotally connecting a tipping trailer body also connected by a tipping ram to a tipping trailer chassis comprising:
   an elongate lever arm;
   a body pivot mounting on the arm for connection to the trailer body;
   a chassis pivot mounting on the arm and spaced apart from the body pivot mounting for connection to the vehicle chassis;
   actuating means for pivoting the lever arm about the trailer chassis when affixed thereto to cause a portion of the trailer body on raising to project away from and below the chassis.

2. A pivot mounting assembly as claimed in claim 1 in which the spaced apart pivot mountings are so arranged that the body pivot mounting is closer, to the connection point of the tipping ram to the lever arm than the chassis pivot mounting.

3. A pivot mounting assembly as claimed in claim 2 in which the body pivot mounting, in use with the trailer body lowered onto the trailer chassis is above the chassis pivot mounting.

4. A pivot mounting assembly as claimed in claim 2 in which there is provided a base frame for connection to the trailer chassis and in which the chassis pivot mounting is pivotally connected to the base frame.

5. A pivot mount assembly as claimed claim 2 comprising a trailer body engaging support for the trailer body when the trailer body projects beyond and below the trailer chassis.

6. A pivot mount assembly as claimed in claim 2 in which the spacing between the pivot mountings is chosen to allow the trailer body to rest on the ground.

7. A pivot mount assembly as claimed in claim 2 in which the actuating means is a ram connected to the lever arm and the ram has a connector for mounting on the lever arm and a connector for mounting on the vehicle chassis.

8. A tipping trailer incorporating a pivot mounting as claimed in claim 2.

9. A pivot mounting assembly as claimed in claim 1 in which the body pivot mounting, in use with the trailer body lowered onto the trailer chassis is above the chassis pivot mounting.

10. A pivot mounting assembly as claimed in claim 9 in which there is provided a base frame for connection to the trailer chassis and in which the chassis pivot mounting is pivotally connected to the base frame.

11. A pivot mount assembly as claimed claim 9 comprising a trailer body engaging support for the trailer body when the trailer body projects beyond and below the trailer chassis.

12. A pivot mount assembly as claimed in claim 9 in which the spacing between the pivot mountings is chosen to allow the trailer body to rest on the ground.

13. A pivot mount assembly as claimed in claim 9 in which the actuating means is a ram connected to the lever arm and the ram has a connector for mounting on the lever arm and a connector for mounting on the vehicle chassis.

14. A tipping trailer incorporating a pivot mounting as claimed in claim 9.

15. A pivot mounting assembly as claimed in claim 1 in which there is provided a base frame for connection to the trailer chassis and in which the chassis pivot mounting is pivotally connected to the base frame.

16. A pivot mount assembly as claimed claim 15 comprising a trailer body engaging support for the trailer body when the trailer body projects beyond and below the trailer chassis.

17. A pivot mount assembly as claimed in claim 15 in which the spacing between the pivot mountings is chosen to allow the trailer body to rest on the ground.

18. A pivot mount assembly as claimed in claim 15 in which the actuating means is a ram connected to the lever arm and the ram has a connector for mounting on the lever arm and a connector for mounting on the vehicle chassis.

19. A tipping trailer incorporating a pivot mounting as claimed in claim 15.

20. A pivot mount assembly as claimed claim 1 comprising a trailer body engaging support for the trailer body when the trailer body projects beyond and below the trailer chassis.

21. A pivot mount assembly as claimed in claim 20 in which the spacing between the pivot mountings is chosen to allow the trailer body to rest on the ground.

22. A pivot mount assembly as claimed in claim 20 in which the actuating means is a ram connected to the lever arm and the ram has a connector for mounting on the lever arm and a connector for mounting on the vehicle chassis.

23. A tipping trailer incorporating a pivot mounting as claimed in claim 20.

24. A pivot mount assembly as claimed in claim 1 in which the spacing between the pivot mountings is chosen to allow the trailer body to rest on the ground.

25. A pivot mount assembly as claimed in claim 24 in which the actuating means is a ram connected to the lever arm and the ram has a connector for mounting on the lever arm and a connector for mounting on the vehicle chassis.

26. A tipping trailer incorporating a pivot mounting as claimed in claim 24.

27. A pivot mount assembly as claimed in claim 1 in which the actuating means is a ram connected to the lever arm and the ram has a connector for mounting on the lever arm and a connector for mounting on the vehicle chassis.

28. A tipping trailer incorporating a pivot mounting as claimed in claim 27.

29. A tipping trailer incorporating a pivot mounting as claimed in claim 1.

30. A pivot mounting assembly for pivotally connecting a tipping trailer body also connected by a tipping ram to a tipping trailer chassis comprising:
    an elongate lever arm;
    a body pivot mounting on the arm for connection to the trailer body;
    a chassis pivot mounting on the arm and spaced apart from the trailer pivot mounting for connection to the vehicle chassis;
    an actuating ram connected to the lever arm;
    mounting means for connecting the ram to the trailer chassis whereby pivoting the lever arm about the chassis pivot mounting causes portion of the trailer body to project away from and below the trailer chassis.

31. A pivot mounting assembly as claimed in claim 30 in which the spaced apart pivot mountings are so arranged that the body pivot mounting is closer, to the connection point of the tipping ram to the lever arm than the chassis pivot mounting.

32. A pivot mounting assembly as claimed in claim 31 in which the body pivot mounting, in use with the trailer body lowered onto the trailer chassis is above the chassis pivot mounting.

33. A pivot mounting assembly as claimed in claim 31 in which there is provided a base frame for connection to the trailer chassis and in which the chassis pivot mounting is pivotally connected to the base frame.

34. A pivot mount assembly as claimed claim 31 comprising a trailer body engaging support for the trailer body when the trailer body projects beyond and below the trailer chassis.

35. A pivot mount assembly as claimed in claim 31 in which the spacing between the pivot mountings is chosen to allow the trailer body to rest on the ground.

36. A tipping trailer incorporating a pivot mounting as claimed in claim 31.

37. A pivot mounting assembly as claimed in claim 30 in which the body pivot mounting, in use with the trailer body lowered onto the trailer chassis is above the chassis pivot mounting.

38. A pivot mounting assembly as claimed in claim 37 in which there is provided a base frame for connection to the trailer chassis and in which the chassis pivot mounting is pivotally connected to the base frame.

39. A pivot mount assembly as claimed claim 37 comprising a trailer body engaging support for the trailer body when the trailer body projects beyond and below the trailer chassis.

40. A pivot mount assembly as claimed in claim 37 in which the spacing between the pivot mountings is chosen to allow the trailer body to rest on the ground.

41. A pivot mounting assembly as claimed in claim 30 in which there is provided a base frame for connection to the trailer chassis and in which the chassis pivot mounting is pivotally connected to the base frames.

42. A pivot mount assembly as claimed claim 41 comprising a trailer body engaging support for the trailer body when the trailer body projects beyond and below the trailer chassis.

43. A pivot mount assembly as claimed in claim 41 in which the spacing between the pivot mountings is chosen to allow the trailer body to rest on the ground.

44. A pivot mount assembly as claimed claim 30 comprising a trailer body engaging support for the trailer body when the trailer body projects beyond and below the trailer chassis.

45. A pivot mount assembly as claimed in claim 44 in which the spacing between the pivot mountings is chosen to allow the trailer body to rest on the ground.

46. A pivot mount assembly as claimed in claim 30 in which the spacing between the pivot mountings is chosen to allow the trailer body to rest on the ground.

47. A tipping trailer comprising:
    a trailer chassis having a front end and a rear end ground engaging wheels on the trailer chassis;
    a trailer body on the trailer chassis;
    a pair of laterally spaced apart elongate lever arms connecting the trailer body to the trailer chassis adjacent the rear end of the trailer chassis;

a body pivot mounting on each lever arm for connection to the trailer body;

a chassis pivot mounting on each arm and spaced apart from the body pivot mounting for connection to the vehicle chassis;

an actuating ram means adjacent the rear and of the trailer chassis for pivoting the lever arms relative to the trailer chassis;

a tipping ram remote from the lever arms adjacent the front end of the trailer chassis and mounted between the trailer chassis and body for pivoting the trailer body about the body pivot mountings towards and away from a position resting on the trailer chassis.

48. A tipping trailer as claimed in claim 47 in which said actuating ram means includes a pair of actuating rams mounted between the trailer body and the trailer chassis adjacent each lever arm.

49. A tipping trailer as claimed in claim 48 in which the spaced apart pivot mountings are so arranged that the body pivot mounting is closer to the connection point of the tipping ram to the lever arm than the chassis pivot mounting.

50. A tipping trailer as claimed in claim 48 in which the body pivot mounting in use with the trailer body lowered onto the trailer chassis is above the chassis pivot mounting.

51. A tipping trailer as claimed in claim 48 in which the chassis pivot mounting on each lever arm is mounted on a base frame which is in turn mounted on the vehicle chassis.

52. A tipping trailer as claimed claim 48 comprising a trailer body engaging support for the trailer body when the trailer body projects beyond and below the trailer chassis.

53. A tipping trailer as claimed in claim 48 in which the spacing between the pivot mountings is chosen to allow the trailer body to rest on the ground.

54. A tipping trailer as claimed in claim 47 in which the spaced apart pivot mountings are so arranged that the body pivot mounting is closer to the connection point of the tipping ram to the lever arm than the chassis pivot mounting.

55. A tipping trailer as claimed in claim 54 in which the body pivot mounting in use with the trailer body lowered onto the trailer chassis is above the chassis pivot mounting.

56. A tipping trailer as claimed in claim 54 in which the chassis pivot mounting on each lever arm is mounted on a base frame which is in turn mounted on the vehicle chassis.

57. A tipping trailer as claimed claim 54 comprising a trailer body engaging support for the trailer body when the trailer body projects beyond and below the trailer chassis.

58. A tipping trailer as claimed in claim 54 in which the spacing between the pivot mountings is chosen to allow the trailer body to rest on the ground.

59. A tipping trailer as claimed in claim 47 in which the body pivot mounting in use with the trailer body lowered onto the trailer chassis is above the chassis pivot mounting.

60. A tipping trailer as claimed in claim 59 in which the chassis pivot mounting on each lever arm is mounted on a base frame which is in turn mounted on the vehicle chassis.

61. A tipping trailer as claimed claim 60 comprising a trailer body engaging support for the trailer body when the trailer body projects beyond and below the trailer chassis.

62. A tipping trailer as claimed in claim 60 in which the spacing between the pivot mountings is chosen to allow the trailer body to rest on the ground.

63. A tipping trailer as claimed in claim 47 in which the chassis pivot mounting on each lever arm is mounted on a base frame which is in turn mounted on the vehicle chassis.

64. A tipping trailer as claimed claim 63 comprising a trailer body engaging support for the trailer body when the trailer body projects beyond and below the trailer chassis.

65. A tipping trailer as claimed in claim 63 in which the spacing between the pivot mountings is chosen to allow the trailer body to rest on the ground.

66. A tipping trailer as claimed claim 47 comprising a trailer body engaging support for the trailer body when the trailer body projects beyond and below the trailer chassis.

67. A tipping trailer as claimed in claim 66 in which the spacing between the pivot mountings is chosen to allow the trailer body to rest on the ground.

68. A tipping trailer as claimed in claim 47 in which there is an actuating ram mounted between each lever arm and the trailer chassis.

69. A tipping trailer as claimed in claim 68 in which the spaced apart pivot mountings are so arranged that the body pivot mounting is closer to the connection point of the tipping ram to the lever arm than the chassis pivot mounting.

70. A tipping trailer as claimed in claim 69 in which the body pivot mounting in use with the trailer body lowered onto the trailer chassis is above the chassis pivot mounting.

71. A tipping trailer as claimed in claim 69 in which the chassis pivot mounting on each lever arm is mounted on a base frame which is in turn mounted on the vehicle chassis.

72. A tipping trailer as claimed claim 69 comprising a trailer body engaging support for the trailer body when the trailer body projects beyond and below the trailer chassis.

73. A tipping trailer as claimed in claim 69 in which the spacing between the pivot mountings is chosen to allow the trailer body to rest on the ground.

\* \* \* \* \*